(12) United States Patent
Pham et al.

(10) Patent No.: US 9,737,988 B2
(45) Date of Patent: Aug. 22, 2017

(54) METHODS AND DEVICES FOR DEMONSTRATING THREE-PLAYER PURSUIT-EVASION GAME

(71) Applicant: Intelligent Fusion Technology, Inc, Germantown, MD (US)

(72) Inventors: Khanh D. Pham, Kirtland AFB, NM (US); Dan Shen, Germantown, MD (US); Genshe Chen, Germantown, MD (US); Haibin Ling, Philadelphia, PA (US); Erik Blasch, Rome, NY (US)

(73) Assignee: Intelligent Fusion Technology, Inc, Germantown, MD (US)

( * ) Notice: Subject to any disclaimer, the term of this patent is extended or adjusted under 35 U.S.C. 154(b) by 389 days.

(21) Appl. No.: 14/529,153

(22) Filed: Oct. 31, 2014

(65) Prior Publication Data

US 2016/0121204 A1    May 5, 2016

(51) Int. Cl.
*A63H 30/06* (2006.01)
*B25J 9/16* (2006.01)
*G05D 1/00* (2006.01)
*G06Q 10/00* (2012.01)
*G06T 7/73* (2017.01)
(Continued)

(52) U.S. Cl.
CPC ............ *B25J 9/163* (2013.01); *G05D 1/0094* (2013.01); *G06Q 10/00* (2013.01); *G06T 7/248* (2017.01); *G06T 7/254* (2017.01); *G06T 7/74* (2017.01); *A63F 13/56* (2014.09); *A63F 13/573* (2014.09); *G05B 2219/31008* (2013.01); *G05B 2219/34348* (2013.01); *G06T 2207/10032* (2013.01); *G06T 2207/30204* (2013.01);
(Continued)

(58) Field of Classification Search
CPC ....... B25J 9/1682; B25J 13/089; Y10S 901/01
See application file for complete search history.

(56) References Cited

U.S. PATENT DOCUMENTS 8,332,544 B1 * 12/2012 Ralls .............. A63F 13/92
340/573.1
2008/0050711 A1 * 2/2008 Doswell ............... G09B 7/02
434/350

OTHER PUBLICATIONS

"Pursuit-Evasion Games with Unmanned Ground and Aerial Vehicles" by Vidal. R. et al. [http://ieeexplore.ieee.org/stamp/stamp.jsp?tp=&arnumber=933069>-;>,IEEE, Proceedings of IEEE Intl Conference on Robotics and Automation, Seoul, Korea, May 2001, pp. 2948-2955.*

(Continued)

*Primary Examiner* — James S McClellan
*Assistant Examiner* — Syvila Weatherford
(74) *Attorney, Agent, or Firm* — Anova Law Group, PLLC

(57) ABSTRACT

Methods and devices for demonstrating three-player pursuit-evasion (PE) game are provided using a hardware-in-loop test-bed. Robots including pursuer robots and an evader robot are arranged on a solid surface. A drone is positioned flying above to oversee the robots to capture a video or an image sequence of the robots. A robot thread process and a drone thread process are implemented by a computer. In the robot thread process, a tracking-by-detection process is perform to provide a state of the robot including a location and a heading direction of the robot; a delay compensation is conducted; and a PE game is called to calculate a robot command. In the drone thread process, a drone control is calculated to make the drone follow an evader robot, the drone control is sent to the drone, and user commands are also checked.

20 Claims, 6 Drawing Sheets

(51) Int. Cl.
*G06T 7/246* (2017.01)
*G06T 7/254* (2017.01)
*A63F 13/573* (2014.01)
*A63F 13/56* (2014.01)

(52) U.S. Cl.
CPC ... *G06T 2207/30236* (2013.01); *Y10S 901/00* (2013.01); *Y10S 901/01* (2013.01)

(56) References Cited

OTHER PUBLICATIONS

"Search and Pursuit-Evasion in Mobile Robotics" by Chung, T. et al. Autonomous Robotics [2011] [www-users.cs.umn.edu/~isler/pub/pe-survey.pdf].*

Pursuit-evasion Games for a Team of UAVs under Dynamic Environment by Chen, Y. et al. [2005] [http://proceedings.spiedigitallibrary.org/data/.Conferences/SPIEP/30246/59854M_1.pdf].*

"Simple-Motion Pursuit-Evasion Differential Games, ..." [Pachter, M. & Yavin, Y.J Optim Theory Appl (1986) 51:95].*

* cited by examiner

METHODS AND DEVICES FOR DEMONSTRATING THREE-PLAYER PURSUIT-EVASION GAME

GOVERNMENT RIGHTS

This invention was made with Government support under Contract No. FA9453-12-C-0228, awarded by the United States Air Force. The U.S. Government has certain rights in this invention.

DESCRIPTION OF THE DISCLOSURE

The present disclosure relates to the field of game theory and, more particularly, relates to methods and devices for demonstrating a three-player pursuit-evasion (PE) game using a hardware-in-loop test-bed.

BACKGROUND

Pursuit-evasion (PE) games are mathematical tools to analyze conflicting situations of two sides: pursuers and evaders. Dynamics of each actor is modeled by differential equations for continuous time cases or difference equations for discrete time solutions. The pursuer and evader are coupled by their cost functions. Such games are applied in areas with varied geometry and graphs, sensor management, collision avoidance, and high-level information fusion. However, PE games are mostly implemented and tested by numerical simulations, where real-life physical constraints, time-delay feedback, and computational feasibility are not fully considered. It therefore desirable to have a hardware-in-loop test-bed to demonstrate various PE games with real-world limitations.

Thus, there is a need to overcome these and other problems of the prior art and to provide methods and devices for demonstrating a three-player pursuit-evasion (PE) game using a hardware-in-loop test-bed.

BRIEF SUMMARY OF THE DISCLOSURE

One aspect or embodiment of the present disclosure includes a method for demonstrating a game theory by a hardware demonstrator. In the method, robots including pursuer robots and an evader robot are arranged on a solid surface. A drone is positioned flying above to oversee the robots to capture a video or an image sequence of the robots. In a robot thread process implemented by a computer and comprising a Timer thread process, on a first Timer, a first command is sent to a robot. An image of the robot after receiving the first command is obtained. The image is captured by the drone. A tracking-by-detection process is performed to provide a state of the robot including a location and a heading direction of the robot. Delay compensation is conducted. A PE game is called to calculate a second robot command. In a drone thread process implemented by a drone controller running in the computer, images of the robots are captured. Locations of the robots are calculated from the images of the robots. A drone control is calculated to make the drone follow an evader robot. The drone control is sent to the drone. User commands are checked. When an exit command is not issued, process in the drone thread is repeated by first re-capturing images of the robots.

Optionally, in the tracking-by-detection process, a background modeling is performed to determine a background image. Regions of interest (ROIs) are extracted by a connected component algorithm. An orientation of the robot in each ROI is estimated by a Histogram-based analysis of gradient distribution. The robot in each ROI is detected and classified according to a best match score. Parameters with the best match score are used as detection result. Robustness is improved by integrating temporal information and by integrating multiple target associations between target robots and robot templates.

To perform the background modeling, the background image is subtracted from each image frame in a recorded video to preserve pixels associated with the robot. Morphological operations are performed to improve quality of background subtraction.

To detect and classify the robot, a best match in each ROI is searched according to each robot template. The search includes dynamic pruning. A robot template having the best match is found as the detection result. Affine distortion is fine-tuned including areas around the field boundary.

To conduct the delay compensation, delays between a time when an image is being captured by the drone and a time when the image is received by the computer is determined. The delays are measured using frames in a recorded video. A one-step-ahead state of the robot is calculated based on the state of the robot and on the first calculated command to compensate the delays to provide delay-compensated state of the robot used in the called PE game.

Optionally, a timer is set for robot controls in the robot thread process. Execution duration is set for the robot controls to provide sufficient time for performing the tracking-by-detection process and for conducting the delay compensation.

A learning method is used to estimate parameters by: (a) recording an initial state $(x_0, y_0, h_0)$ of the robot using the tracking-by-detection process from images captured by the drone, (b) sending a command to the robot, (c) obtaining a first location and heading state $(x_1, y_1, h_1)$ of the robot by tracking algorithms, (d) calculating a first state change $(\Delta x_1, \Delta y_1, \Delta h_1)$, where $\Delta x_1 = x_1 - x_0$, $\Delta y_1 = y_1 - y_0$, and $\Delta h_1 = h_1 - h_0$, (e) sending an opposite command to the robot, (f) obtaining a second location and heading state $(x_2, y_2, h_2)$ of the robot after the opposite command by the tracking algorithms, (g) calculating a second state change $(\Delta x_2, \Delta y_2, \Delta h_2)$, where $\Delta x_2 = x_2 - x_1$, $\Delta y_2 = y_2 - y_1$, and $\Delta h_2 = h_2 - h_1$, and (h) repeating steps (a)-(g) for a plurality of times to provide a plurality of the first state changes and a plurality of the second state changes, and computing an average of each of the first state changes $(\Delta x_1, \Delta y_1, \Delta h_1)$ and the second state changes $(\Delta x_2, \Delta y_2, \Delta h_2)$.

Optionally, when calculating the locations of the robots from the images of the robots in the drone thread process, the heading of the robots is not calculated to save a large amount of computing time.

When calling the PE game to calculate the second robot command in the robot thread process, the states of the robots by performing the tracking-by-detection process are sent to a three-player PE game model to solve the states of the robots comprising the two pursuer robots and one evader robot using a game equilibrium in a game solution. The game equilibrium provides the second robot command respectively to the pursuer robots and the evader robot.

A plurality of scenario configurations is sent to a pursuer agent and an evader agent running on the computer to test the game theory.

Another aspect or embodiment of the present disclosure includes a hardware demonstrator device for demonstrating a game theory. The device includes robots, a drone, and a computer. The robots include pursuer robots and an evader robot placed on a solid surface. The drone is configured flying above to oversee the robots to capture a video or an image sequence of the robots. The computer is configured with a pursuer agent and an evader agent and configured to perform a Timer thread process to: send a first command to a robot, obtain an image of the robot after receiving the first command, the image being captured by the drone, perform a tracking-by-detection process to provide a state of the robot comprising a location and a heading direction of the robot, conduct a delay compensation, and call a PE game to calculate a second robot command. A drone controller operated on the computer is configured to: control the drone to capture images of the robots, calculate locations of the robots from the images of the robots, calculate a drone control to make the drone follow an evader robot, send the drone control to the drone, and check user commands.

Each robot includes a wireless radio, built in drive commands, and a sensor including a laser and a camera. Each robot is configured for sending the image or the video to the computer, and for commanding acknowledge and response to a corresponding agent on the computer.

The computer is configured to send commands for moving, commands for camera, and commands for laser to each robot. The drone-controller is a proportional-integral-derivative (PID)-based drone controller.

Optionally, the device further includes a parameter estimator configured to compute an average of a first state change ($\Delta x_1$, $\Delta y_1$, $\Delta h_1$) based on a command to the robot over an initial state, and a second state change ($\Delta x_2$, $\Delta y_2$, $\Delta h_2$) based on an opposite command to the robot and the command. Optionally, the device further includes a graphical user interface (GUI) with a scenario manager on the computer.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DETAILED DESCRIPTION

Figure 1:
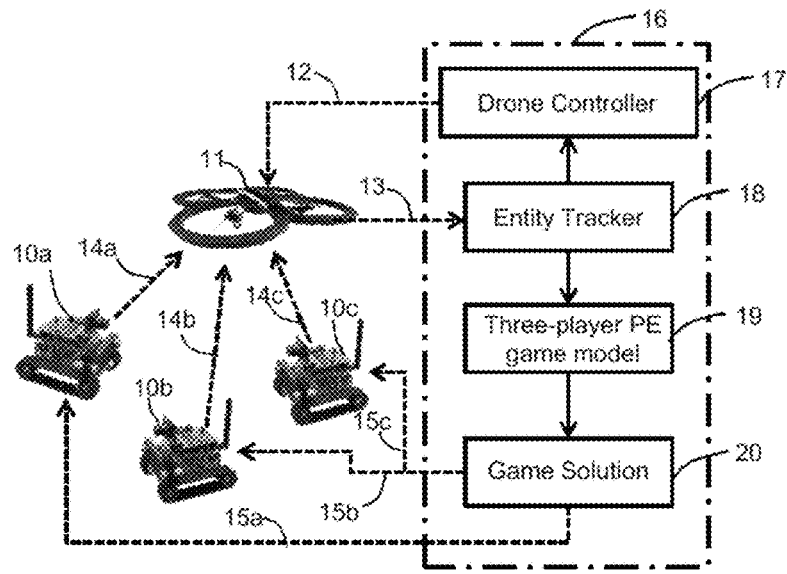
FIG. 1 depicts an exemplary hardware demonstrator for three-player pursuit-evasion games consistent with various disclosed embodiments.

Reference will now be made in detail to exemplary embodiments of the disclosure, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced. These embodiments are described in sufficient detail to enable those skilled in the art to practice the disclosure and it is to be understood that other embodiments may be utilized and that changes may be made without departing from the scope of the disclosure. The following description is, therefore, merely exemplary.

Methods and devices for demonstrating pursuit-evasion (PE) games are provided. A hardware demonstrator can include a hardware-in-loop test bed to demonstrate various pursuit-evasion (PE) games and associated information fusion. In one embodiment, a hardware demonstrator for three-player game pursuit-evasion (PE) games can be provided. For example, a three-player PE game engine (including, e.g., game model and game solution) can be used to model interaction between two slow pursuer robots and one fast evader robot with real-hardware physical constraints, time-delay feedback, and asymmetric information structures.

In an exemplary hardware demonstrator, two slow moving pursuer robots can chase one fast moving evader robot. A drone, such as a quadrotor drone, can be positioned to be flying above the exemplary three robots to oversee robots. Both the robots and drone can be connected to, or otherwise communicated with a computer, e.g., via a wireless local area network (WLAN).

As used herein, the robots and drone can also be defined as actors. Each actor (robot or drone) can be represented by a corresponding computer agent (or software agent) operated on the computer. Dynamics of each actor (robot or drone) can be modeled by difference equations, which can be learned from certain experiments. The state/pose (e.g., locations and/or heading directions) of each robot can be estimated by an entity tracker (e.g., including visual entity detection and use of tracking algorithms), which may first process video streams captured by the flying drone.

Based on the robot states and dynamics, a three-player PE game is constructed to model the conflicting situations: while pursuer robots try to minimize a distance to the evader robot and evader robot maneuvers to maximize the distance. The robot control (or command) strategies are based on the PE game solution. In one embodiment, the flying drone can be controlled to follow the evader robot. The hardware demonstrator can thus integrate robot dynamic models, entity-tracking algorithms, sensor fusion methods, and PE game engine for the three exemplary robots (e.g., the two slow pursuer robots and one fast evader robot).

In various embodiments, the drone can be configured, e.g., with a high-definition (HD) camera, to capture videos of robots, such that the state determination can be obtained via a tracking-by-detection process including visual entity detection and tracking algorithms by the entity tracker. For example, a number of markers can be configured associated with each robot to achieve an optimum balance of location accuracy and tracking robustness. For detecting a target robot, after background modeling is performed, the robot orientation is estimated from the local gradient patterns.

Drone controller can be a proportional-integral-derivative (PID)-based controller, configured to guide the flying drone to follow the evader robot. Generally, due to delays in measurement channels (including, e.g., camera and communication delays), the drone controller often receives out-of-date information. Therefore, delay information can be measured and delay measurement compensation can be determined, based on history of robot movements and drone commands. Control performance can then be improved.

Based on the theoretically-derived robot dynamic model, a parameter estimator is designed to learn unknown parameters in robot dynamics. Then a three-player PE game is derived and solved to calculate robot controls of pursuer and evader robots based on the estimated robots' states and learned dynamic equations.

A graphical user interface (GUI) with a scenario manager can also be used to integrate the above-mentioned components. Various "two-slow-pursuer vs. one-fast-evader" scenarios have been used to test the hardware demonstrator to provide supportive results.

In FIG. 1, an exemplary hardware demonstrator is provided. The hardware demonstrator can be used for three-player PE games. Three exemplary robots $10a$, $10b$, and $10c$ are included. For example, robots $10a$-$10b$ can be pursuer robots, while robot $10c$ can be an evader robot. A drone 11 can be positioned to be flying above and overseeing the robots $10a$-$c$. The flying drone 11 can have a wide-angle camera to capture videos to include all activities (e.g., moving information) and any possible information of robots $10a$-$c$ via routes $14a$, $14b$, and $14c$, respectively as shown in FIG. 1.

The hardware demonstrator in FIG. 1 also includes software-related apparatus 16 running on a same or different computer(s) (not shown). Apparatus 16 can have a drone controller 17 (e.g., a PID-based drone controller with delay compensation), an entity tracker 18 (e.g., a visual entity tracking with pose estimation), a PE game model 19 (e.g., a 3-player PE game model), and/or a game solution 20 (e.g., a mixed Nash equilibrium based game solution).

For example, the drone controller 17 can calculate drone controls based on current states of robots $10a$-$10c$ with delay compensation and send corresponding commands to the drone 11, e.g., via wireless communication link 12. Entity tracker 18 can first obtain robot video (or image sequence) from drone 11, e.g., via wireless link 13. Then entity tracker 18 can estimate or calculate robot states.

The estimated robot states can then be shared with the drone controller 17 and also shared with the PE game model 19, which can further be solved using a game equilibrium, such as a mixed Nash equilibrium, in the game solution 20. The game equilibrium can include robots' motion commands. The robots' motion commands can be sent to evader robot $10c$ via wireless link $15c$ and to pursuer robots $10a$-$b$ via wireless links $15a$-$b$, respectfully.

Figure 2:
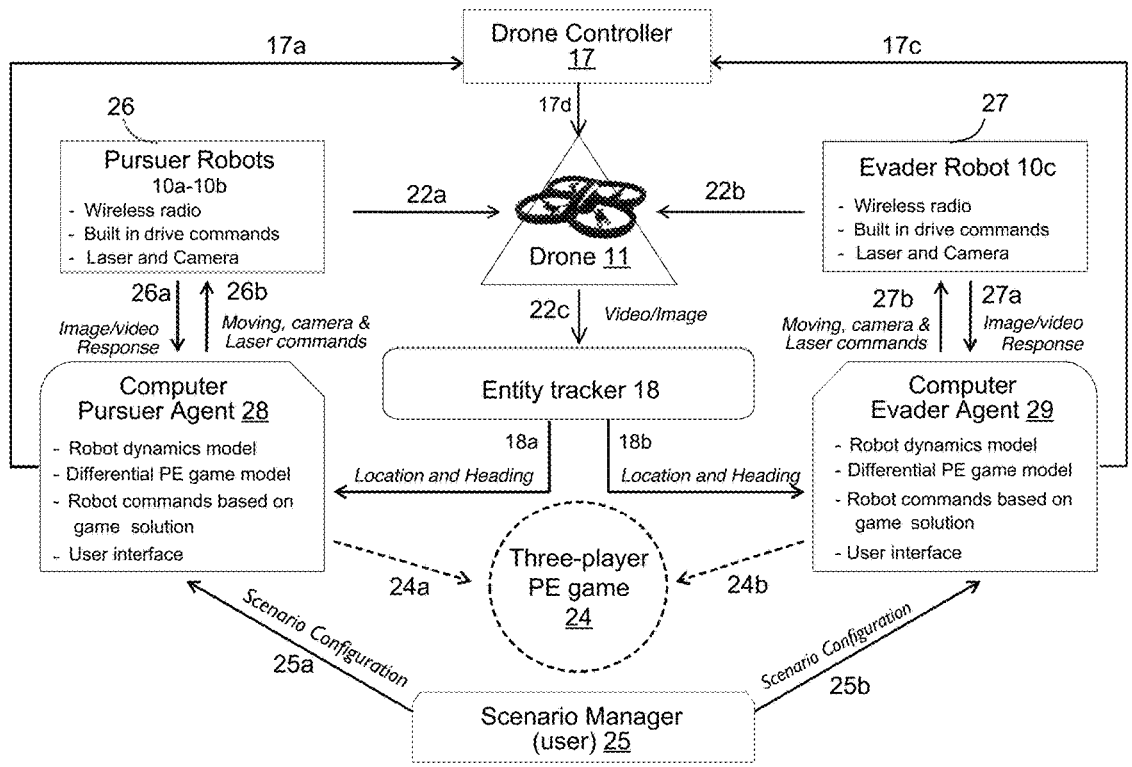
FIG. 2 depicts an exemplary three-player game engine demonstrated by a hardware demonstrator consistent with various disclosed embodiments.

FIG. 2 depicts an exemplary three-player game engine demonstrated by the hardware demonstrator consistent with various disclosed embodiments. Unlike conventional simulation methods that merely use computer networks without involving any hardware, the exemplary three-player game engine can further include hardware actors to demonstrate desired game theory. Meanwhile, cyber network security problems can also be addressed.

Corresponding to the exemplary hardware demonstrator in FIG. 1, the drone controller 17 in FIG. 2 can obtain pursuer state through communication link $17a$ and can obtain evader states via communication link $17c$. Then the drone controller 17 can compute and send commands to the flying drone 11 via communication link $17d$.

Pursuer robots 26 (e.g., including robots $10a$-$10b$) can include a wireless radio, built in drive commands, and/or sensors (including laser(s) and/or camera(s)). Pursuer robots 26, in a form of pursuer-robot hardware, can be connected with a computer having pursuer agent 28 (e.g., including software agent for pursuer) running on the computer via communication links $26a$ and $26b$. For example, each of robots $10a$-$10b$ can send image(s)/video(s) to and/or can command acknowledge(s)/response(s) to the pursuer agent 28 via communication link $26a$. Commands for moving, camera, and laser can also be sent to pursuer robots $10a$-$10b$ from computer pursuer agent 28 through communication link $26b$.

Similar to the pursuer robots, evader robot 27 (e.g., including robot $10c$) can include a wireless radio, built in drive commands, and/or sensors (including laser(s) and/or camera(s)). Evader robot 27, in a form of pursuer-robot hardware, can be connected with a computer having evader agent 29 (e.g., including software agent for evader) running on the computer via communication links $27a$ and $27b$. For example, robot $10c$ can send image(s)/video(s) to and/or can command acknowledge(s)/response(s) to the evader agent 29 via communication link $27a$. Commands for moving, camera, and laser can also be sent to pursuer robot $10c$ from computer evader agent 29 through communication link $27b$.

Drone 11 can observe the robots via communication Links $22a$ and $22b$. The captured video (or image sequence) of the robots can be sent from drone 11 and processed by entity tracker 18. In some cases, entity tracker 18 can run on a same or a different computer as for computer agents 28 and 29. Entity tracker 18 can further provide observation service, e.g., can provide observation results of laser(s) and camera (s) in each robot.

For example, entity tracker 18 can provide calculated pursuer states and calculated evader states to corresponding pursuer and evader agents 28 and 29, via communication links $18a$ and $18b$, respectively. Pursuer agent 28 and evader agent 29 can then play a three-player PE game 24 (e.g., with differential information structure) via communication links $24a$ and $24b$.

To demonstrate various cases, a scenario manager 25 can also be included. For example, scenario configurations can be sent to pursuer agent 28 and evader agent 29 and via communication links $25a$ and $25b$, respectively.

Figure 3:
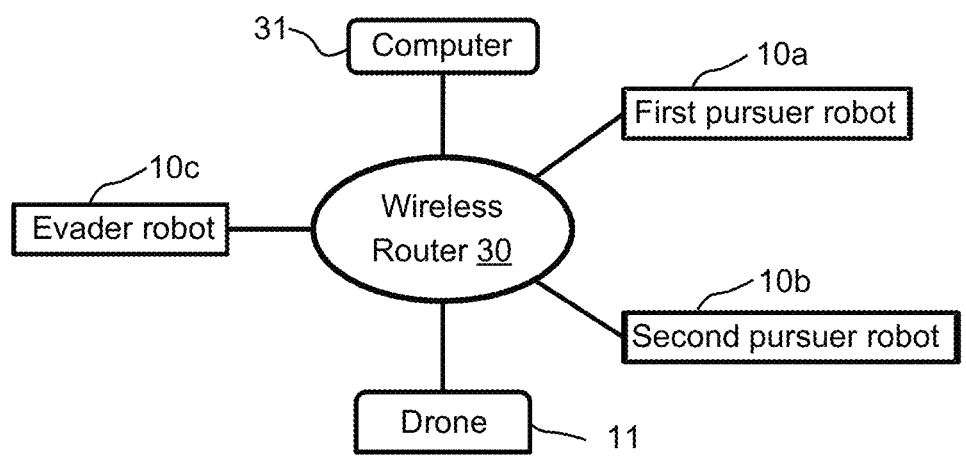
FIG. 3 depicts an exemplary hardware connection consistent with various disclosed embodiments.

FIG. 3 shows an exemplary hardware connection consistent with various disclosed embodiments. For example, a wireless router 30 can be a hub and can be connected to a computer 31 (for example, a personal computer, a laptop, a mobile phone, and/or a tablet), a first pursuer robot $10a$, a second pursuer robot $10b$, a flying drone 11, and an evader robot $10c$.

In various embodiments, robots $10a$-$10c$ can include, for example, a Surveyor SRV-1 Blackfin (an Open Source Wireless Mobile Robot with Video camera). Such robots can provide Lantronix Matchport 802.11b/g WiFi, 500 Mhz analog devices Blackfin BF537, 32 MB SDRAM, and 4 MB Flash. To remotely or wirelessly control the robots, an internet protocol (IP) address can be assigned to each robot. Using the IP address, the robots can be connected to a wireless device server, e.g., Matchport, through the command computer serial port.

Flying drone 11 can include, e.g., AR Drone 2.0. Flying drone 11 can have mechanical structure that allows four rotors attached to four ends of a crossing of the flying drone, to which a battery and radio frequency (RF) hardware can be attached. In various embodiments, apparatus 16 of FIG. 1 can be operated on computer 31 shown in FIG. 3.

Figure 4:
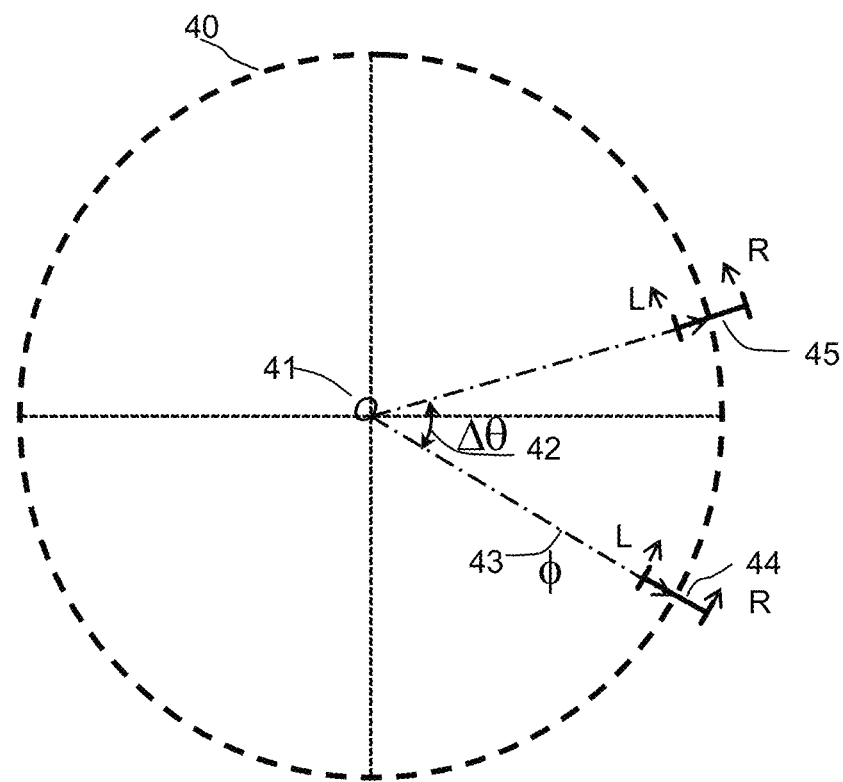
FIG. 4 depicts exemplary motion features of robots consistent with various disclosed embodiments.

FIG. 4 illustrates exemplary motion features of robots consistent with various disclosed embodiments. For example, a robot (e.g., Surveyor Blackfin) can support moving command of: "Mabc", where "M" (with ASCII code 4D) denotes moving command type, "a" denotes left speed (where 0x00 through 0x7F means forward, and 0xFF through 0x80 means backward), "b" denotes right speed, and "c" denotes duration time (e.g., about 10 milliseconds, where duration of 00 means infinite). That said, 4D32CF14 may mean M 50 −50 20, i.e., rotate right for 200 milliseconds. 4D000000 can be a stop command.

A moving command can guide a robot moving along a circle 40 as shown in FIG. 4. The robot can have an initial state 44 having a location and heading direction shown in FIG. 4, where L and R denote the left and right speed, respectively. Radius (ϕ) 43 depends on the left-right speed radio. The circle center (O) 41 is determined by initial state 44 and radius 43. After a moving command, the robot can move from an initial state 44 to a state 45 having a different location and heading direction along the circle 40. Such moving of the robot can be specified by an angle difference (Δθ) 42 shown in FIG. 4. For example, the angle difference can be decided by radius 43, command duration t, and robot average speed (L+R)/2.

Usually, actual speed of a robot is different from commanded speed to the robot. That is: $L_A=f_L(L_C)$, where $L_C$ is a commanded left speed, and $L_A$ is an actual left speed. Similarly, $R_A=f_R(R_C)$, where $R_C$ is a commanded right speed, and $R_A$ is an actual right speed. The functions $f_L$ and $f_R$ mainly depend on robot motor battery level and floor conditions (or conditions of any suitable solid surface that robots are placed on) on which robots move. $f_L$ and $f_R$ are modeled as linear functions:

$$L_A=f_L(L_C)=mL_C+n \quad (1)$$

$$R_A=f_R(R_C)=pR_C+q \quad (2)$$

where "m" and "p" are the weighted functions to control speed, and n and q are noises or disturbances. The relations between robot location (x, y), robot heading (h), and moving command $(L_A, R_A, t)$ are illustrated in FIG. 5.

Figure 5:
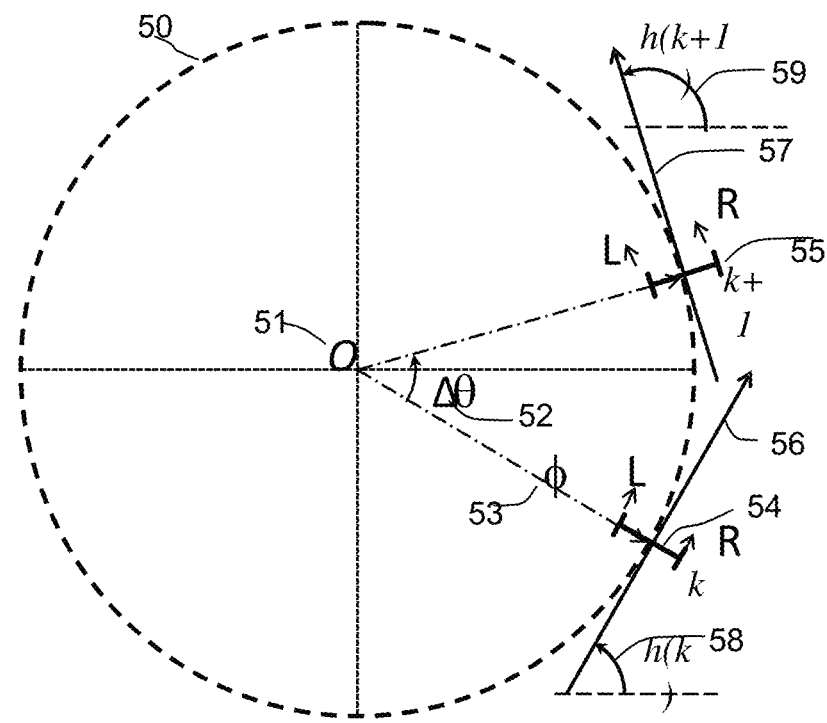
FIG. 5 depicts dynamics of robots consistent with various disclosed embodiments.

FIG. 5 illustrates dynamics of robots. Specifically, the robot dynamics include the following equations.

$$\Delta\theta=(L+R)t/4\pi\phi \quad (3)$$

$$h(k+1)=h(k)+\Delta\theta \quad (4)$$

$$O_x=x(k)+\phi \cos[h(k)+\pi/2] \quad (5)$$

$$O_y=y(k)+\phi \sin[h(k)+\pi/2] \quad (6)$$

$$\begin{bmatrix} x(k+1) \\ y(k+1) \end{bmatrix} = \begin{bmatrix} \cos(\Delta\theta), & -\sin(\Delta\theta) \\ \sin(\Delta\theta), & \cos(\Delta\theta) \end{bmatrix} \begin{bmatrix} x(k)-O_x \\ y(k)-O_y \end{bmatrix} + \begin{bmatrix} O_x \\ O_y \end{bmatrix} \quad (7)$$

where L is herein interchangeable with $L_A$: meaning actual left speed; R is herein interchangeable with $R_A$: meaning actual right speed; $(O_x, O_y)$ is the location of circle center 51, [x(k), y(k)] is the location of the robot at time k; and h(k) indicates a heading angle made by a heading direction of robot at time k (e.g., a tangential line 56 at time k of robot's moving circle 50) with the x-axis direction of x(k).

Figure 6:
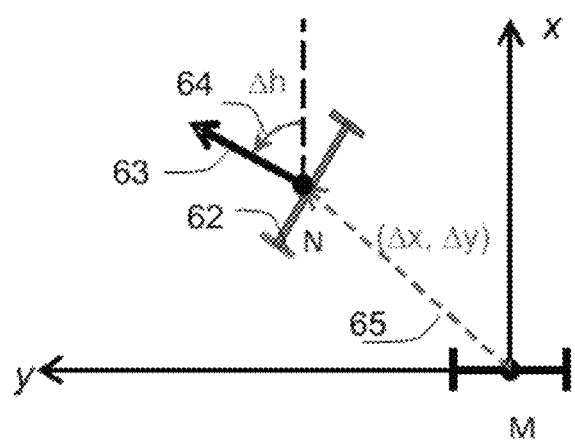
FIG. 6 depicts exemplary command effect on movement of a robot consistent with various disclosed embodiments.

Accordingly, FIG. 6 illustrates an exemplary command effect (Δx, Δy, Δh), where (Δx, Δy) indicates location change 65 from an initial location M to a moved location N in a local coordinate of a robot, and Δh indicates heading change 64 from the initial location M to the moved location N in the global coordinate system and local coordinate system. FIG. 6 also provides an exemplary heading state 63 at the moved location N after the moving command.

Various embodiments include a parameter estimator used to learn effects of moving commands and to learn unknown parameters in robot dynamics. For example, the parameter estimator can be used to: (a) record current state $(x_0, y_0, h_0)$ of a robot using tracking algorithms (as described in FIG. 7 for more details) in the tracking-by-detection process from overhead images; (b) send a command to the robot; (c) obtain the location and heading state $(x_1, y_1, h_1)$ of the robot through the tracking algorithms; (d) calculate a first state change $(\Delta x_1, \Delta y_1, \Delta h_1)$, where $\Delta x_1=x_1-x_0$, $\Delta y_1=y_1-y_0$, and $\Delta h_1=h_1-h_0$, $$\begin{bmatrix} \Delta x_1 \\ \Delta y_1 \end{bmatrix} = \begin{bmatrix} \cos(h_0), & \sin(h_0) \\ -\sin(h_0), & \cos(h_0) \end{bmatrix} \begin{bmatrix} x_1-x_0 \\ y_1-y_0 \end{bmatrix}; \quad (8)$$

(e) send an opposite command to the robot, where the "opposite" operator is defined as: opposite (M a b c)=M −a −b c; (f) obtain the location and heading state $(x_2, y_2, h_2)$ of the robot after the opposite command using the tracking algorithms; (g) calculate a second state change $(\Delta x_2, \Delta y_2, \Delta h_2)$, where $\Delta x_2=x_2-x_1$, $\Delta y_2=y_2-y_1$, $\Delta h_2=h_2-h_1$, and $$\begin{bmatrix} \Delta x_2 \\ \Delta y_2 \end{bmatrix} = \begin{bmatrix} \cos(h_1), & \sin(h_1) \\ -\sin(h_1), & \cos(h_1) \end{bmatrix} \begin{bmatrix} x_2-x_1 \\ y_2-y_1 \end{bmatrix}; \quad (9)$$

(h) repeat steps (a)-(g) for multiple (m) times; and (h) compute an average of each of the first state change $(\Delta x_1, \Delta y_1, \Delta h_1)$ and the second state change $(\Delta x_2, \Delta y_2, \Delta h_2)$.

By using opposite commands each time following the command to robot, the robot can be controlled not to go outside of the camera view. Table 1 provides calculated states (locations and heading directions) of pursuer and evader robots after the robot commands. In Table 1, (M 50 50 30) denotes a forward command; (M 70 30 30) denotes a turn-right command; (M 64 −64 30) denotes a clockwise rotate command; (M −70 −30 30) denotes a back-right command; (M −50 −50 30) denotes a backward command; (M −30 −70 30) denotes a back-left command; (M −64 64 30) denotes a counter clockwise rotate command; and (M 30 70 30) denotes a turn-left command.

As disclosed herein, the actually measured states of robots can be obtained and compared with the calculated states of robots calculated based on the initial location of a robot and the effects depicted in Table 1. Such comparisons were performed by examining different moving commands including: after forward and backward commands, after three turn right commands then three back right commands, after three counter clockwise rotate commands then three clockwise rotate commands, after three left turn commands then three back left commands, etc. As a result, with consideration of the accumulated errors of about 25 commands, the learned effects based on the disclosed calculations were sufficiently consistent with the actually measured results for the disclosed hardware demonstrator.

TABLE 1

Robot command effects of Pursuer and Evader

| Commands | Effects of Pursuer robot | | | Effects of Evader robot | | |
|---|---|---|---|---|---|---|
| | Δx (pixel) | Δy (pixel) | Δh (rads) | Δx (pixel) | Δy (pixel) | Δh (rads) |
| M 50 50 30 | 27.3413 | 0.9204 | 0.0025 | 19.6783 | 1.6466 | 0.0674 |
| M 70 30 30 | 24.2671 | 0.0959 | −0.1181 | 18.3379 | 0.5706 | −0.0108 |
| M 64 −64 30 | 2.3673 | −5.8313 | 0.8874 | 3.3457 | −3.9752 | 0.7130 |
| M −70 −30 30 | −25.5022 | −4.4570 | 0.1438 | −19.2438 | 0.0141 | 0.0496 |
| M −50 −50 30 | −28.5634 | −2.2056 | 0.0127 | −20.7374 | −0.4016 | −0.0515 |
| M −30 −70 30 | −23.7300 | 1.3157 | −0.1199 | −16.5537 | 3.6019 | −0.2797 |
| M −64 64 30 | 2.8010 | 5.3365 | −0.8673 | −1.6785 | 5.3420 | −0.6631 |
| M 30 70 30 | 24.5951 | 1.1929 | 0.1409 | 17.4523 | 0.2917 | 0.2987 |

Figure 7:
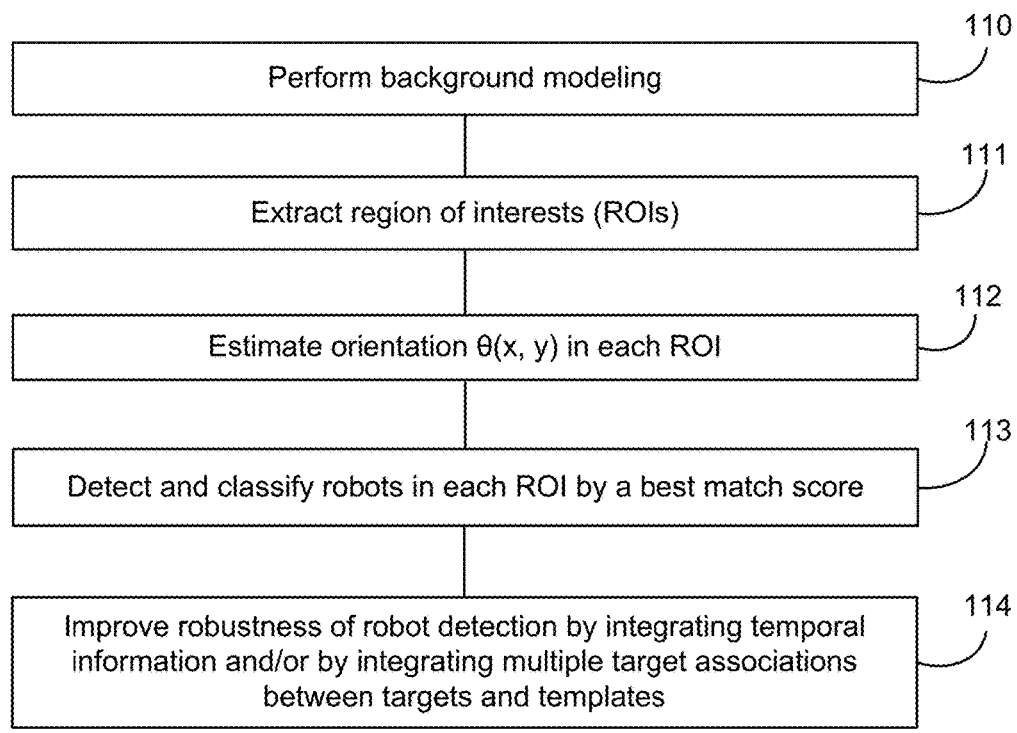
FIG. 7 depicts an exemplary tracking-by-detection process consistent with various disclosed embodiments.

FIG. 7 illustrates an exemplary tracking-by-detection process, e.g., using entity tracker 18 in FIG. 1 consistent with various disclosed embodiments. Markers (or fiducials) can be used to locate the mobile robots in different environment conditions. The tracking-by-detection (or "detection and tracking") process can include, for example, performing background modeling in Step 110, extracting region of interest (ROI) in Step 111, estimating robot orientation in Step 112, detecting and classifying the robot in Step 113, and/or improving robustness in Step 114 of FIG. 7. The image-based robot location estimation can be used for robot control and for enabling the PE game analysis.

In Step 110, background modeling is performed. For example, let $I_1, I_2, \ldots, I_k$ be a number of k of input images, each having a size of m×n. Background image (B) can have a size m×n and be calculated as:

$$B(x,y) = \text{median}(I_1(x,y), I_2(x,y), \ldots, I_k(x,y)) \quad (10)$$

Median filter is known to be robust to noises and corruptions in background modeling. In experiments, median filter can generate satisfying results to enable PE game examination in the disclosed hardware demonstrator. The determined background image can be used for background subtraction. For example, each image frame is subtracted by the background image to preserve pixels associated with the robot motion.

To improve quality of background subtraction, morphological operations (MO) are used to eliminate noise (mainly due to illumination changes) and to fill holes in potential foreground regions. The MO procedure can include erosion (e.g., to remove small isolated noise) and dilation (e.g., to fill small holes in foreground). The MO procedure can ensure that the foreground targets are detected and each component is fully connected. Dynamic model can then be updated after the background subtraction and the morphological operations.

In Step 111, region-of-interest (ROI) can be extracted by a connected component algorithm. One robot may cover about 800 pixels. When a detected region is too small, such too-small region can be discarded immediately. When two or more robots are merged together, the connected region can be much larger and multiple targets in one connected region can be easily detected. Situation awareness can indicate that there is more than one robot.

In various embodiments, to design effective markers for robots, the following factors, including distinctness, robustness, and efficiency, can be considered.

For example, the markers should be distinct from surrounding background. In addition, markers for different robots should be distinguishable from each other. The makers should be sufficiently robust against illumination change, state change, and/or camera projection (e.g., distortion when a robot is around the field boundary). The markers should facilitate to improve efficiency of orientation estimation.

In Step 112, given each extracted region of interest (ROI), a template matching process can be used to search for robots and their states. For example, a search can be performed along two dimensions of the location and one dimension of direction (or heading direction).

In one embodiment, at most, three robots can be detected. Thus, for a candidate region having an exemplary size of about 30×30 and having 72 (i.e., 360/5) directions, 194,400 searches (i.e., 3×30×30×72) are needed for only one region. Thus, a large number of seconds can be used to process only one frame. But when facilitated by auxiliary line markers with strong edge feature, the disclosed method can calculate edge direction, and narrow down the number of search from about 72 directions to only about 2 directions (or about 2±3 directions when more accurate direction(s) are needed). A Histogram-based analysis of gradient distribution can be used. For each detected ROI, gradient of each pixel along x-direction and y-direction can be calculated as:

$$\theta(x, y) = \text{atan}\left(\frac{\partial I(x, y)}{\partial y}, \frac{\partial I(x, y)}{\partial x}\right) \quad (11)$$

It should be noted that, the state estimation (or calculation) still has the ±π ambiguity, which can be solved by checking orientations at two opposite directions.

In Step 113, robot location can be determined by robot detection and classification for each ROI. For each candidate ROI region, detection algorithms can rotate the image according to a detection direction. Then to reduce noise, a thresholding step can be performed to find a white and black region of the target. The thresholds can be set empirically and based on red-green-blue (RGB) and hue, saturation, and intensity color spaces. Then the detection algorithm can compare the processed image with the template images at each location and two orientations to find the best match score. The score can be computed as:

$$\text{score}(x, y) = \begin{cases} 1 & \text{if template}(x, y) = \text{threshImage}(x, y) \\ 0 & \text{otherwise} \end{cases} \quad (12)$$

$$\text{score of a region} = \Sigma_{(x,y)} \text{score}(x,y) * \text{mask}(x,y) \quad (13)$$

where: (x, y) is location of a pixel in an image, and mask (x, y) is a 0 or 1 valued number: 0 is for background and 1 is for foreground. The parameters with the best match score can be selected as the detection result.

Robot detection and classification for each ROI can include, for example, searching a best match in the ROI according to each robot template, efficiently searching with dynamic pruning, finding a template have the best match as the detection result, and/or fine tuning for affine distortion, e.g., around the field boundary.

In Step 114, robustness of robot detection can be improved, e.g., by integrating temporal information with the detection score of each candidate ROI region.

For a candidate X at frame t, score from template T contains three parts as follows:

$$\text{score}(X,T,t) = \text{Sim}(X,T) + \lambda_1 \cos(|X_{dir} - T_{dir}^{t-1}|) + \lambda_2 e^{-\lambda_2 \text{Dist}(X_{pos}, X_{pos}^{t-1})} \quad (14)$$

where the first term sim(X, T) indicates degree of similarity between candidate X and template T, the second term $\lambda_1 \cos(|X_{dir} - T_{dir}^{t-1}|)$ measures orientation (e.g., heading direction) change of candidate X over time, and the third term $\lambda_2 e^{-\lambda_2 \text{Dist}(X_{pos}, X_{pos}^{t-1})}$ captures location change of candidate X over time. The temporal constraint can be controlled in the second and third terms, weighted by $\lambda_1$ and $\lambda_2$, where $\lambda_1 > 0$ and $\lambda_2 > 0$ are design parameters for weighing the relative importance of the three above-mentioned terms. In one embodiment, $\lambda_1 = \lambda_2 = 1$.

Figure 8:
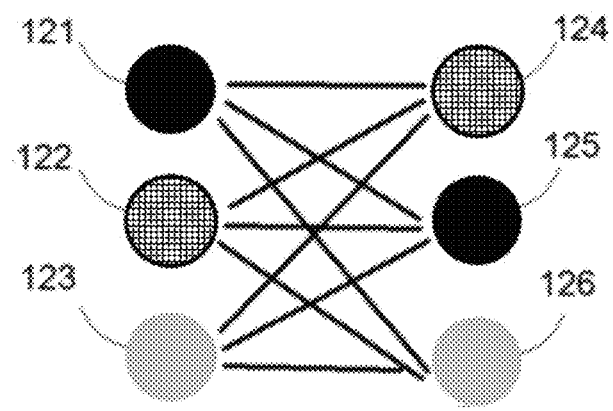
FIG. 8 depicts an exemplary method for improving robustness of robot detection by integrating multiple target-template associations consistent with various disclosed embodiments.

Till in Step 114, optionally, robustness can further be improved, e.g., by integrating multiple target associations as shown in FIG. 8.

FIG. 8 depicts an exemplary method for improving robustness of robot detection by integrating multiple target associations consistent with various disclosed embodiments. Although different templates are used for three different robots, it is still a challenge to distinguish them from one another under certain conditions, e.g., in a condition when different robots are cluttered together. To alleviate this issue, in FIG. 8, one-to-one association between targets (or candidates) 121, 122, and 123, and templates 124, 125, and 126 can be emphasized, where same colors may indicate association with one-one constraints. Table 2 shows a corresponding similarity-matrix.

TABLE 2

|  | Template 124 | Template 125 | Template 126 |
|---|---|---|---|
| Target 121 | 421 | 534 | 408 |
| Target 122 | 468 | 432 | 407 |
| Target 123 | 488 | 405 | 476 |

In a case when multiple target associations are not integrated, both targets 122 and 123 can match template 124, which however is often incorrect for robot detection. When multiple target associations are integrated to improve robot detection robustness, target 121 can match with template 125. This is because, in a row of target 121 in the similarity matrix of Table 2, the second column has largest value (i.e., 534 in Table 2). Then target 122 can match template 124 because first column of target 122 in the similarity matrix of Table 2 has the largest value for the target 122. Then target 123 can match template 126 because only column of template 126 of the target 123 is left after the association processes of the first two targets 121 and 122. In this case, such robustness improvement method can allow all three pairs of target-template to be more suitably matched.

In the three-player PE game model, the three players include two pursuer robots and one evader robot. The two pursuer robots are cooperative to capture the evader robot. In the game setup, one pursuer is modelled as main pursuer (MP) and the other one is modelled as assistant pursuer (AP). The objective of the MP is to chase the evader (E), and the AP is to assist MP. In a desired information set, all three players know the objectives of other players. Given a moving action of the MP, the AP can calculate own action, which is a Nash equilibrium (NE) or mixed NE of two player game played by AP and E.

Therefore, actions of AP depend on actions of MP. The dependency can be defined as $c_{AP} = \Psi(c_{MP}, X_E, h_E, X_{MP}, h_{MP}, X_{AP}, h_{AP})$, where $c_{MP}$ denotes actions of MP; $(X_E, h_E)$ denotes current state of evader E; $(X_{MP}, h_{MP})$ denotes current state of MP; $(X_{AP}, h_{AP})$ denotes current state of AP; and $c_{AP}$ denotes actions of AP. Then, the three-player discrete-time PE game model can be defined as:

$$X_{MP}(k+1) = X_{MP}(k) + A_{MP}(h_{MP}(k), c_{MP}(k)) \quad (15)$$

$$h_{MP}(k+1) = h_{MP}(k) + H_{MP}(c_{MP}(k)) \quad (16)$$

$$C_{AP}(k) = \Psi(c_{MP}(k), X_E(k), h_E(k), X_{MP}(k), h_{MP}(k), X_{AP}(k), h_{AP}(k)) \quad (17)$$

$$x_{AP}(k+1) = X_{AP}(k) + A_{AP}(h_{AP}(k), c_{AP}(k)) \quad (18)$$

$$h_{AP}(k+1) = h_{AP}(k) + H_{AP}(c_{AP}(k)) \quad (19)$$

$$X_E(k+1) = X_E(k) + A_E(h_E(k), c_E(k)) \quad (20)$$

$$h_E(k+1) = h_E(k) + H_E(c_E(k)) \quad (21)$$

$$D(k) = \min(\|X_{MP}(k) - X_E(k)\|, \|X_{AP}(k) - X_E(k)\|) \quad (22)$$

$$J_P(k) = \min(D(k+1), r^1 D(k-2), \ldots, r^{n-1} D(k+n)) \quad (23)$$

$$J_E(k) = \min(-D(k+1), -r^{-1} D(k-2), \ldots, -r^{-n+1} D(k+n)) \quad (24)$$

$$\{c_{MP}^*(k), \ldots, c_{MP}^*(k+n)\} = \arg\min J_P(k) \quad (25)$$

$$\{c_E^*(k), \ldots, c_E^*(k+n)\} = \arg\min J_E(k) \quad (26)$$

where: $A_{MP}$ and $H_{MP}$ are the nonlinear system dynamics respectfully for location and heading of main pursuer (MP) robot. The robot's nonlinear system dynamics are based on the robot dynamics in eq. (1)-(7), which can be similar dynamics for AP robot and evader robot. K denotes time index. D(k) denotes a distance between pursuers and evader. n denotes a planning horizon, and r>1 is the discount factor, which is included to model the fact that the future performance is less important than the current performance.

Therefore, the pursuer's objective function (eq. 23) is the minimal distance of the n steps. Similarly, the objective of evader is the maximum of the n distance, i.e., the minimum of the n negative distances (eq. 24). The optimal action sets of n steps are computed from eq. (25) to eq. (26). Note that only the first step can be applied to the above equations, because, after that, a next game can be constructed with "new" system states for locations and headings of robots based on "new" measurements from the overhead-view camera and the visual tracking algorithms.

Figure 9:
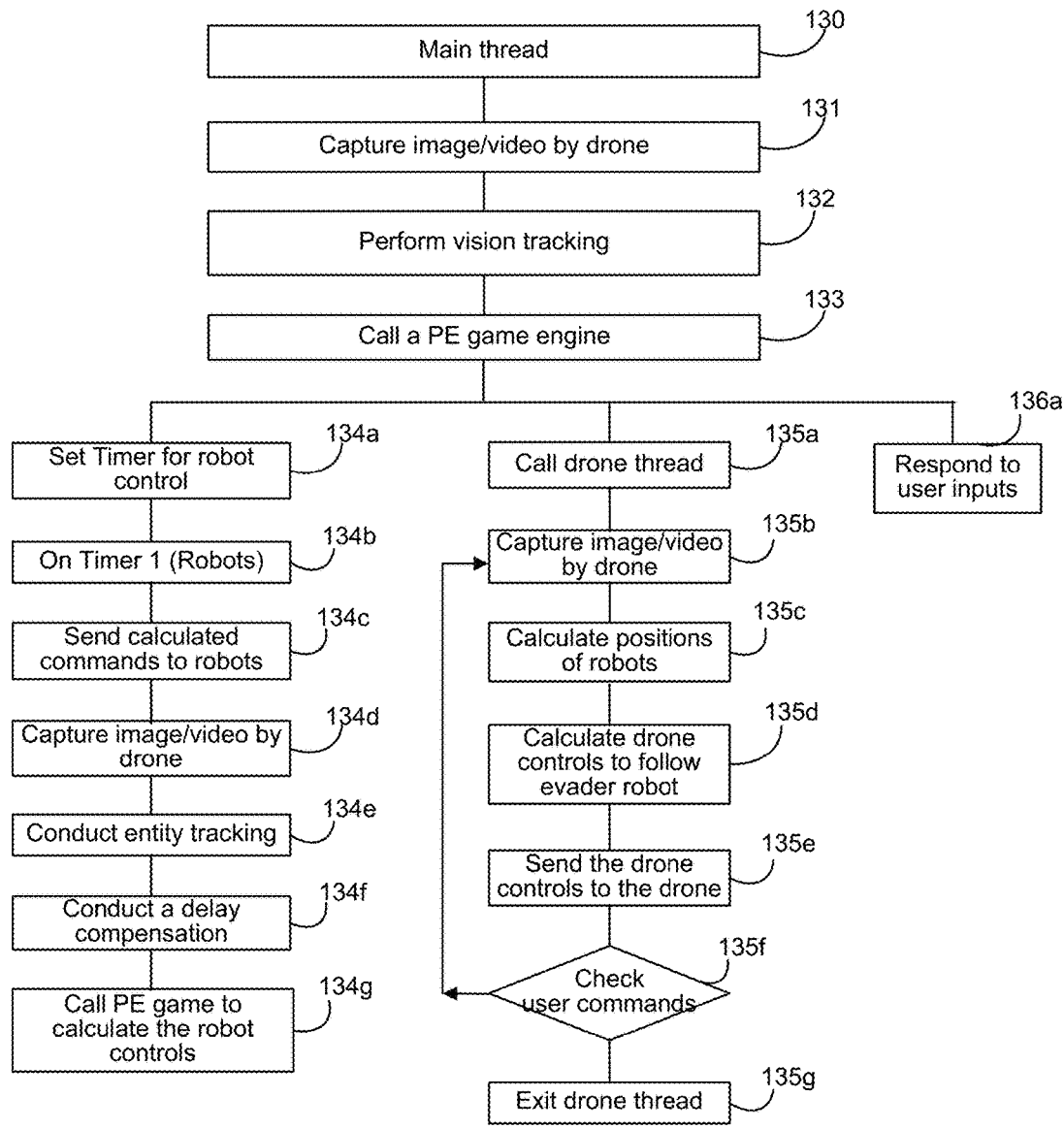
FIG. 9 depicts an exemplary multiple-thread process of a hardware demonstrator consistent with various disclosed embodiments.

FIG. 9 depicts an exemplary multiple-thread process of hardware demonstrator consistent with various disclosed embodiments.

In Step 130, a main thread can start, e.g., for initialization.

In Step 131, images and/or videos can be obtained from a drone. The image/video can cover activities of all three robots.

In Step 132, visual tracking can be performed to initialize states (e.g., locations and heading directions) of robots.

In Step 133, a PE game engine (including a game model and a game solution) can be called to calculate robot controls for all three robots. Then the main thread can start multiple threads.

For example, in Step 134a, a timer can be set for robot controls of robot thread. The robot controls can be created as a timer thread, e.g., having an execution duration of about 360 milliseconds. The duration is set such that delays (see FIG. 10) can be handled.

In Step 135a, a drone thread can be called with shorter period than the robot thread.

Figure 11:
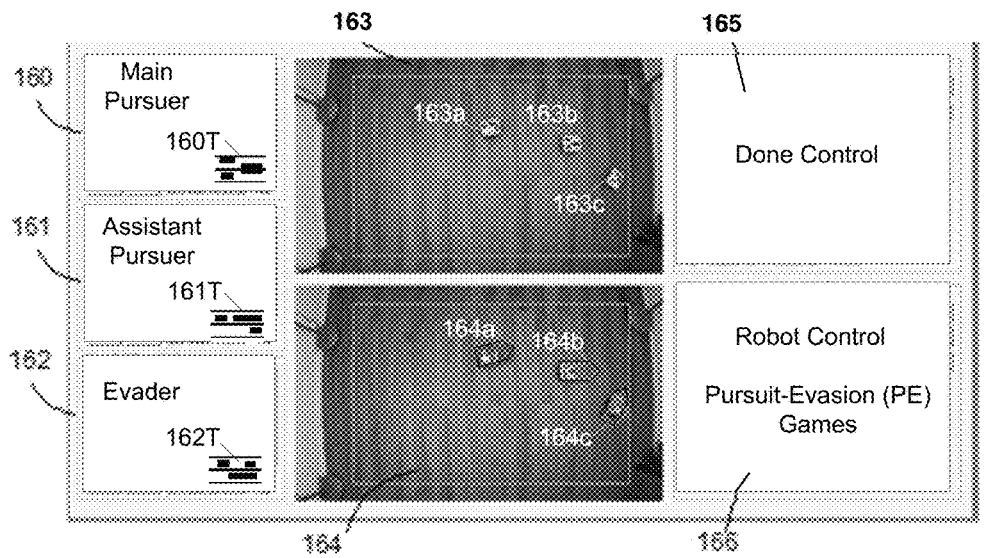
FIG. 11 depicts an exemplary graphical user interface (GUI) for a hardware demonstrator consistent with various disclosed embodiments.

In Step 136a, the main thread can respond to user inputs, for example, to stop the simulation, to switch control mode, etc. (also see FIG. 11).

Referring back to the robot control thread following Step 134a, on Timer 1 set in Step 134b, calculated commands can be sent to robots in Step 134c. Then a new image/video can be obtained from the drone in Step 134d. In Step 134e, a visual tracking can be conducted to obtain robot states.

In Step 134f, delay compensation can be conducted based on current states and robot moving commands. For example, one-step-ahead states of the robots can be estimated, based on the current states and the controls to compensate delays.

In Step 134g, new robot commands/controls can be calculated, e.g., by calling a PE game. The new robot commands/controls can be saved.

Referring back to the drone control thread starts in Step 135a, current image/video of robots can be captured by the drone in Step 135b.

In Step 135c, only locations of robots can be calculated from the robot image/video. It should be noted that robot heading are not calculated in Step 135c. Not calculating heading information of robots can save a large amount of computing times.

In Steps 135d, drone controls, such as PID-based drone controls, can be calculated to have the drone follow the evader robot.

In Step 135e, the drone controls can be sent to the drone.

In Step 135f, user commands can be checked. When an exit command is issued, the drone control thread can exit in Step 135g. Otherwise the drone control thread can go back to Step 135b to repeat the process.

In various embodiments, methods of measuring delays, between the time when image/video is being captured in the real world and the time when image/video is received by the computer, can be performed to provide delay compensation. A video recorder can be used to capture both the real world events and the images received by the computer agent from the drone. In a real world event, a robot's laser is turned on and off. The delay is measured using frames in the recorded video. By examining and comparing a same pre-determined area in the frames of the recorded videos for both the real world event and in the image received by the computer agent, delay compensation can be determined.

In an exemplary experiment, the real world event of turning the laser on occurred in an exemplary frame numbered as frame No. 12 at time 00:00:29:12, between the $29^{th}$ second and the $30^{th}$ second. While the turning-laser-on event received by the computer agent was found in an exemplary frame numbered as frame No. 25 at time 00:00:29:25, also between the $29^{th}$ second and the $30^{th}$ second. In such experiment, videos were recorded at a 30-frame-rate, the delay can then be calculated as $(25-12)/30=0.433$ s=433 milliseconds.

Once the delay compensation is determined, Step 134f in FIG. 9 can be performed, so that one-step-ahead (e.g., about 433 milliseconds ahead) states of the robots can be calculated based on currently-obtained states and controls of the robots to compensate such delay to provide presumably "actual" (e.g., without consideration of about 433 milliseconds ahead) states of the robots.

Figure 10:
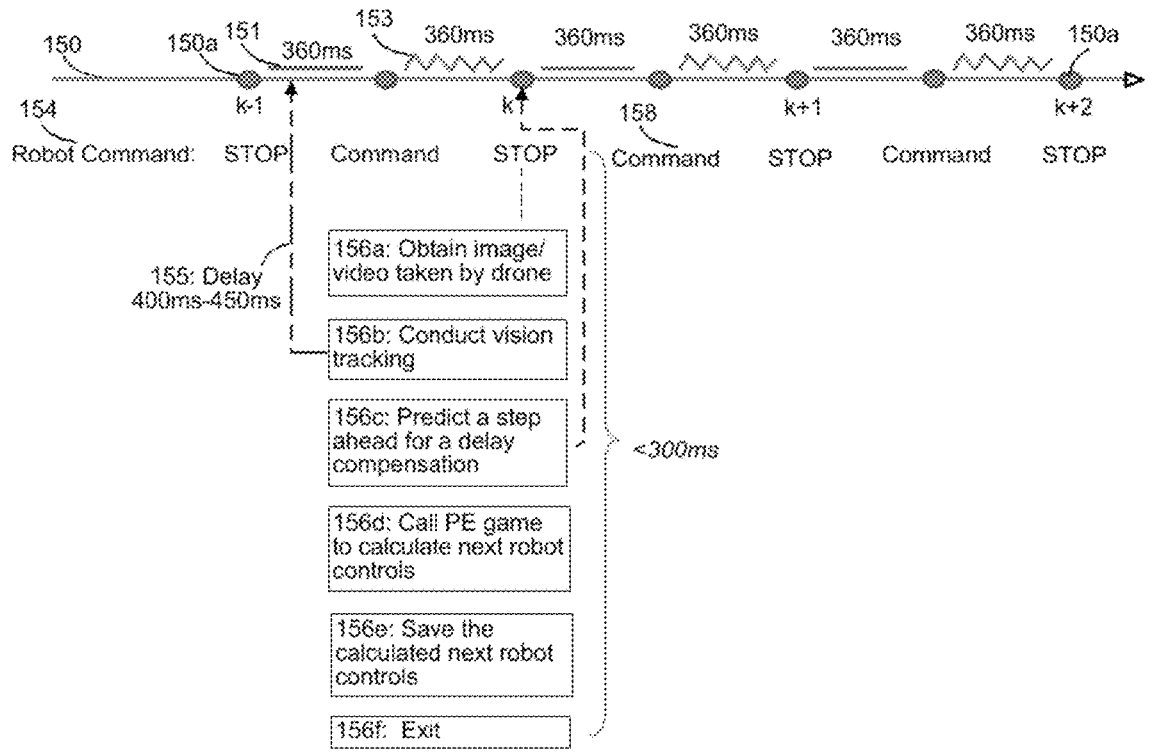
FIG. 10 depicts a method for handling delay when performing a multiple thread process of a hardware demonstrator consistent with various disclosed embodiments.

FIG. 10 illustrating a method for handling delay when performing the multiple thread process (see FIG. 9) of the hardware demonstrator. For example, the robot thread can be performed at various time points 150a on a time line 150. In the robot thread, robot(s) can be stationary at 151 indicated by a solid line (e.g., for an interval of about 360 milliseconds), and can be in motion (guided by a moving command) at 153 indicated by wave line (e.g., for an interval of about 360 milliseconds) in FIG. 10. The exemplary interval of about 360 milliseconds as shown in FIG. 10 can be determined such that visual tracking step 156b can have enough time to obtain the robot's state which is a previous state due to the delay. The robot commands 154, including "STOP", "Command", etc., are the commands sent to robot when the robot thread is executed.

For example, "STOP" means a stop command is sent to robot. "Command" means saved commands (e.g., saved in Step 134g of FIG. 9) are sent to the robot.

At time k, a STOP command can be sent to a robot. Then in Step 156a, the robot thread can include: obtaining an image of robots from drone. In Step 156b, visual tracking can be performed to obtain the robot states.

Because there is a delay 155, e.g., a delay between 400 milliseconds and 450 milliseconds, for the computer agent to receive image from drone, the calculated robot state from Step 156b is for previous time k−1 not for time k. To obtain actual instant state, delay compensation is conducted in Step 156c based on previous states (at time k−1) and the robot moving command (issued between k−1 and k as shown in FIG. 10, and also see 134c in FIG. 9). PE game engine is called in Step 156d to calculate the robots' next moving commands. Then the calculated moving commands can be saved in Step 156e. These saved commands can be issued to robots at 158 between time k and k+1 as shown in FIG. 10 to start a "new" robot thread.

FIG. 16 illustrates an exemplary GUI and scenario manager. The exemplary GUI can include Block 160 for main pursuer (MP) having a corresponding robot template 160T, Block 161 for assistant pursuer (AP) having a corresponding robot template 161T, and Block 162 for evader having a corresponding robot template 162T, respectively.

Block 163 shows images for robots 163a, 163b, and 163c obtained from drone camera. Block 164 shows tracking results for each robot. The bounding box and pointed head of items 164a, 164b, and 164c indicate states (location and heading direction) of robots 163a, 163b, and 163c, respectively. Each robot has two types of states: one type for the measured previous state and the other type for the calculated current state (see FIG. 10: Step 156c).

Block 165 is for the done control, which can include a switch between manual and PID automatic drone control. The manual hotkey controls are mainly used to take off and land the drone.

Block 166 is for the robot control and for pursuit-evasion (PE) games. It can enable the manual controls of robots. These manual robot controls are used to set the initial robot states. Block 166 can also control the hardware PE game demonstration, including start/stop PE game, switch between learning mode and demo mode, etc.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for demonstrating a game theory by a hardware demonstrator, comprising:
    arranging robots, comprising pursuer robots and an evader robot, on a solid surface;
    positioning a drone flying above to oversee the robots to capture a video or an image sequence of the robots;
    in a robot thread process implemented by a computer and comprising a Timer thread process, on a first Timer sending a first command to a robot, obtaining an image of the robot after receiving the first command, the image being captured by the drone, performing a tracking-by-detection process to provide a state of the robot comprising a location and a heading direction of the robot, conducting a delay compensation, and calling a pursuit-evasion (PE) game to calculate a second robot command,
    wherein conducting the delay compensation comprises: determining delays between a time when an image is being captured by the drone and a time when the image is received by the computer, where the delays are measured using frames in a recorded video, and calculating a one-step-ahead state of the robot, based on the state of the robot and on the first calculated command to compensate the delays to provide delay-compensated state of the robot used when calling the PE game; and
    in a drone thread process implemented by a drone controller in the computer, capturing images of the robots, calculating locations of the robots from the images of the robots, calculating a drone control to make the drone follow an evader robot, sending the drone control to the drone, and checking user commands, wherein when an exit command is not issued, repeating process in the drone thread by first re-capturing images of the robots.

2. The method according to claim 1, wherein the tracking-by-detection process comprises:
    performing a background modeling to determine a background image,
    extracting regions of interest (ROIs) by a connected component algorithm,
    estimating an orientation of the robot in each ROI by a Histogram-based analysis of gradient distribution,
    detecting and classifying the robot in each ROI according to a best match score, wherein parameters with the best match score are used as detection result, and
    improving robustness by integrating temporal information and by integrating multiple target associations between target robots and robot templates.

3. The method according to claim 2, wherein performing the background modeling further comprises:
    subtracting the background image from each image frame in a recorded video to preserve pixels associated with the robot, and
    performing morphological operations to improve quality of background subtraction.

4. The method according to claim 2, wherein detecting and classifying the robot comprises:
    searching a best match in each ROI according to each robot template, wherein the searching comprises dynamic pruning,
    finding a robot template having the best match as the detection result, and
    fine-tuning for affine distortion comprising areas around the field boundary.

5. The method according to claim 1, further comprising a learning method to estimate parameters by:
    (a) recording an initial state $(x_0, y_0, h_0)$ of the robot using the tracking-by-detection process from images captured by the drone,
    (b) sending a command to the robot,
    (c) obtaining a first location and heading state $(x_1, y_1, h_1)$ of the robot by tracking algorithms,
    (d) calculating a first state change $(\Delta x_1, \Delta y_1, \Delta h_1)$, where $\Delta x_1 = x_1 - x_0$, $\Delta y_1 = y_1 - y_0$, and $\Delta h_1 = h_1 - h_0$,
    (e) sending an opposite command to the robot,
    (f) obtaining a second location and heading state $(x_2, y_2, h_2)$ of the robot after the opposite command by the tracking algorithms,
    (g) calculating a second state change $(\Delta x_2, \Delta y_2, \Delta h_2)$, where $\Delta x_2 = x_2 - x_1$, $\Delta y_2 = y_2 - y_1$, and $\Delta h_2 = h_2 - h_1$, and
    (h) repeating steps (a)-(g) for a plurality of times to provide a plurality of the first state changes and a plurality of the second state changes, and computing an average of each of the first state changes ($\Delta x_1$, $\Delta y_1$, $\Delta h_1$) and the second state changes ($\Delta x_2$, $\Delta y_2$, $\Delta h_2$).

6. The method according to claim 1, wherein calculating the locations of the robots from the images of the robots in the drone thread process does not calculate the heading of the robots to save a large amount of computing time.

7. The method according to claim 1, wherein calling the PE game to calculate the second robot command in the robot thread process comprises:
sending the states of the robots by performing the tracking-by-detection process to a three-player PE game model to solve the states of the robots comprising the two pursuer robots and one evader robot using a game equilibrium in a game solution, wherein the game equilibrium provides the second robot command respectively to the pursuer robots and the evader robot.

8. The method according to claim 1, further comprising:
sending a plurality of scenario configurations to a pursuer agent and an evader agent running on the computer to test the game theory.

9. A method for demonstrating a game theory by a hardware demonstrator, comprising:
arranging robots, comprising pursuer robots and an evader robot, on a solid surface;
positioning a drone flying above to oversee the robots to capture a video or an image sequence of the robots;
in a robot thread process implemented by a computer and comprising a Timer thread process, on a first Timer sending a first command to a robot, obtaining an image of the robot after receiving the first command, the image being captured by the drone, performing a tracking-by-detection process to provide a state of the robot comprising a location and a heading direction of the robot, conducting a delay compensation, and calling a pursuit-evasion (PE) game to calculate a second robot command;
in a drone thread process implemented by a drone controller in the computer, capturing images of the robots, calculating locations of the robots from the images of the robots, calculating a drone control to make the drone follow an evader robot, sending the drone control to the drone, and checking user commands, wherein when an exit command is not issued, repeating process in the drone thread by first re-capturing images of the robots; and
setting a timer for robot controls in the robot thread process, wherein an execution duration is set for the robot controls to provide sufficient time for performing the tracking-by-detection process and for conducting the delay compensation.

10. The method according to claim 9, wherein the tracking-by-detection process comprises:
performing a background modeling to determine a background image,
extracting regions of interest (ROIs) by a connected component algorithm,
estimating an orientation of the robot in each ROI by a Histogram-based analysis of gradient distribution,
detecting and classifying the robot in each ROI according to a best match score, wherein parameters with the best match score are used as detection result, and
improving robustness by integrating temporal information and by integrating multiple target associations between target robots and robot templates.

11. The method according to claim 10, wherein performing the background modeling further comprises:
subtracting the background image from each image frame in a recorded video to preserve pixels associated with the robot, and
performing morphological operations to improve quality of background subtraction.

12. The method according to claim 10, wherein detecting and classifying the robot comprises:
searching a best match in each ROI according to each robot template, wherein the searching comprises dynamic pruning,
finding a robot template having the best match as the detection result, and
fine-tuning for affine distortion comprising areas around the field boundary.

13. The method according to claim 9, further comprising a learning method to estimate parameters by:
(a) recording an initial state ($x_0$, $y_0$, $h_0$) of the robot using the tracking-by-detection process from images captured by the drone,
(b) sending a command to the robot,
(c) obtaining a first location and heading state ($x_1$, $y_1$, $h_1$) of the robot by tracking algorithms,
(d) calculating a first state change ($\Delta x_1$, $\Delta y_1$, $\Delta h_1$), where $\Delta x_1 = x_1 - x_0$, $\Delta y_1 = y_1 - y_0$, and $\Delta h_1 = h_1 - h_0$,
(e) sending an opposite command to the robot,
(f) obtaining a second location and heading state ($x_2$, $y_2$, $h_2$) of the robot after the opposite command by the tracking algorithms,
(g) calculating a second state change ($\Delta x_2$, $\Delta y_2$, $\Delta h_2$), where $\Delta x_2 = x_2 - x_1$, $\Delta y_2 = y_2 - y_1$, and $\Delta h_2 = h_2 - h_1$, and
(h) repeating steps (a)-(g) for a plurality of times to provide a plurality of the first state changes and a plurality of the second state changes, and computing an average of each of the first state changes ($\Delta x_1$, $\Delta y_1$, $\Delta h_1$) and the second state changes ($\Delta x_2$, $\Delta y_2$, $\Delta h_2$).

14. The method according to claim 9, wherein calculating the locations of the robots from the images of the robots in the drone thread process does not calculate the heading of the robots to save a large amount of computing time.

15. A hardware demonstrator device for demonstrating a game theory, comprising:
robots, comprising pursuer robots and an evader robot, placed on a solid surface;
a drone, flying above to oversee the robots to capture a video or an image sequence of the robots; and
a computer configured with a pursuer agent and an evader agent and configured to perform a Timer thread process to: send a first command to a robot, obtain an image of the robot after receiving the first command, the image being captured by the drone, perform a tracking-by-detection process to provide a state of the robot comprising a location and a heading direction of the robot, conduct a delay compensation, and call a PE game to calculate a second robot command; and
a parameter estimator, configured to compute an average of a first state change ($\Delta x_1$, $\Delta y_1$ $\Delta h_1$) based on a command to the robot over an initial sate, and a second state change ($\Delta x_2$, $\Delta y_2$, $\Delta h_2$) based on an opposite command to the robot and the command,
wherein a drone controller operated on the computer is configured to: control the drone to capture images of the robots, calculate locations of the robots from the images of the robots, calculate a drone control to make the drone follow an evader robot, send the drone control to the drone, and check user commands.

16. The device according to claim 15, wherein each robot comprises a wireless radio, built in drive commands, and a sensor including a laser and a camera.

17. The device according to claim 15, wherein each robot is configured for sending the image or the video to the computer, and for commanding acknowledge and response to a corresponding agent on the computer.

18. The device according to claim 15, wherein the computer is configured to send commands for moving, commands for camera, and commands for laser to each robot.

19. The device according to claim 15, wherein the drone-controller is a proportional-integral-derivative (PID)-based drone controller.

20. The device according to claim 15, further comprising a graphical user interface (GUI) with a scenario manager on the computer.

\* \* \* \* \*